(12) United States Patent
Ress et al.

(10) Patent No.: US 9,094,256 B1
(45) Date of Patent: Jul. 28, 2015

(54) MEDIA CAPABILITY SELECTION

(75) Inventors: David P. Ress, Cary, NC (US); Julian Mitchell, Maidenhead (GB)

(73) Assignee: RPX CLEARINGHOUSE LLC, Dover, DE (US)

( * ) Notice: Subject to any disclaimer, the term of this patent is extended or adjusted under 35 U.S.C. 154(b) by 3426 days.

(21) Appl. No.: 11/018,359

(22) Filed: Dec. 21, 2004

Related U.S. Application Data

(60) Provisional application No. 60/622,138, filed on Oct. 26, 2004.

(51) Int. Cl.
    *G06F 15/16*    (2006.01)
    *H04L 29/06*    (2006.01)

(52) U.S. Cl.
    CPC .................................... *H04L 29/06* (2013.01)

(58) Field of Classification Search
    USPC ......................................................... 709/227
    See application file for complete search history.

(56) References Cited

U.S. PATENT DOCUMENTS

2002/0119821 A1* 8/2002 Sen et al. .................... 463/42

OTHER PUBLICATIONS

Shelén, Olov, et al., "Implementation Agreement for a Dynamic Resource Initiation Protocol (DRIP)," Multiservice Switching Forum Contribution msf2003.066.05, Jun. 24, 2004, 29 pages.

* cited by examiner

*Primary Examiner* — Angela Nguyen
(74) *Attorney, Agent, or Firm* — Withrow & Terranova, PLLC

(57) ABSTRACT

The present invention allows a network policy server or other centralized entity to provide arbitration for selecting media capabilities to use in a communication session between communication clients. In operation, the network policy server will directly or indirectly receive a first message in association with an attempt to establish a communication session from a first communication client. The first message will include the available media capabilities of the first communication client. The network policy server will apply appropriate policies for the first communication client, the network in general, or a combination thereof to select one or more of the first media capabilities to determine a second set of media capabilities, which are provided in response to the first message. This reduced set of media capabilities will ultimately be used to establish the communication session with the first communication client.

29 Claims, 6 Drawing Sheets

MEDIA CAPABILITY SELECTION

This application claims the benefit of U.S. provisional patent application Ser. No. 60/622,138, filed Oct. 26, 2004, the disclosure of which is hereby incorporated by reference in its entirety.

FIELD OF THE INVENTION

The present invention relates to communications, and in particular to a technique for selecting media capabilities for session clients having multiple media capabilities.

BACKGROUND OF THE INVENTION

Packet networks have evolved to become a primary vehicle for delivering real-time and interactive multimedia and streaming media services. These different media services may be established with different types of communication clients, which have different communication capabilities. These capabilities will be referred to as media capabilities, and may relate to supported data rates, encryption techniques, decoding and encoding (codec) techniques, or other session-related characteristics. To date, there are various protocols used for allowing communication clients to exchange their respective media capabilities and select a media capability from the available media capabilities to use in a communication session established between the communication clients. As such, communication clients participating in a communication session may negotiate with one another to select the media capabilities for the communication session. Thus, the ultimate decision on which media capabilities are selected resides with the communication clients participating in the communication session.

Since the communication clients typically are not aware of service level agreements between a subscriber and a service provider or current network conditions, the communication clients are not well positioned to render decisions regarding media selection that meet the objectives and requirements of the service providers, let alone to take into consideration network conditions. Further, many communication clients may be able to use different types of services provided by different service providers. As such, a communication client may simultaneously receive service from different service providers, yet the service providers may not be aware of each other or their relative service agreements with the subscriber. When different media capabilities are available, it would be beneficial to negotiate the selection of media capabilities based on an overall perspective, which is currently unavailable.

Accordingly, there is a need for a more sophisticated negotiation system for selecting media capabilities for communication clients, wherein the selection process occurs in light of subscriber and service provider service agreements, network conditions, or other factors bearing on the efficient allocation of network resources and communication client capabilities.

SUMMARY OF THE INVENTION

The present invention allows a network policy server or other centralized entity to provide arbitration for selecting media capabilities to use in a communication session between communication clients. The communication clients may be endpoints on a customer premise or a content server providing any type of media content, including audio, video, and data services. In operation, the network policy server will directly or indirectly receive a first message in association with an attempt to establish a communication session from a first communication client. The first message will include the available media capabilities of the first communication client. The network policy server will apply appropriate policies for the first communication client, the network in general, or a combination thereof to select one or more of the first media capabilities to determine a second set of media capabilities, which are provided in response to the first message. This reduced set of media capabilities will ultimately be used to establish the communication session with the first communication client.

During establishment of the communication session, a second message in association with the communication session may be received directly or indirectly in association with a second communication client. The second message will include the reduced set of media capabilities. The network policy server will analyze the reduced set of media capabilities in light of the second communication client, and any policies associated therewith, and determine a further reduced set of media capabilities that may be used to establish a communication session. This further reduced set of media capabilities will include one or more media capabilities that are acceptable for establishing a communication session between the first and second communication clients in light of any applicable policies. The communication session is ultimately established using one of the further reduced sets of media capabilities.

In one embodiment, the first and second messages sent to the network policy server arbitrating the media capabilities are sent from one or more service controllers associated with the first and second communication clients. Thus, when the communication session is initiated from the first communication client, an initiation message is sent to the service controller, which will interact with the network policy server to obtain the reduced set of media capabilities. A similar interaction is provided in association with the second communication client, upon attempting to establish the communication session with the first communication client. In another embodiment, the network policy server will receive requests to commit resources directly or indirectly from the service controllers or from the communication clients, determine if sufficient resources are available for the communication session, and provide responses allowing the communication session to be finalized.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
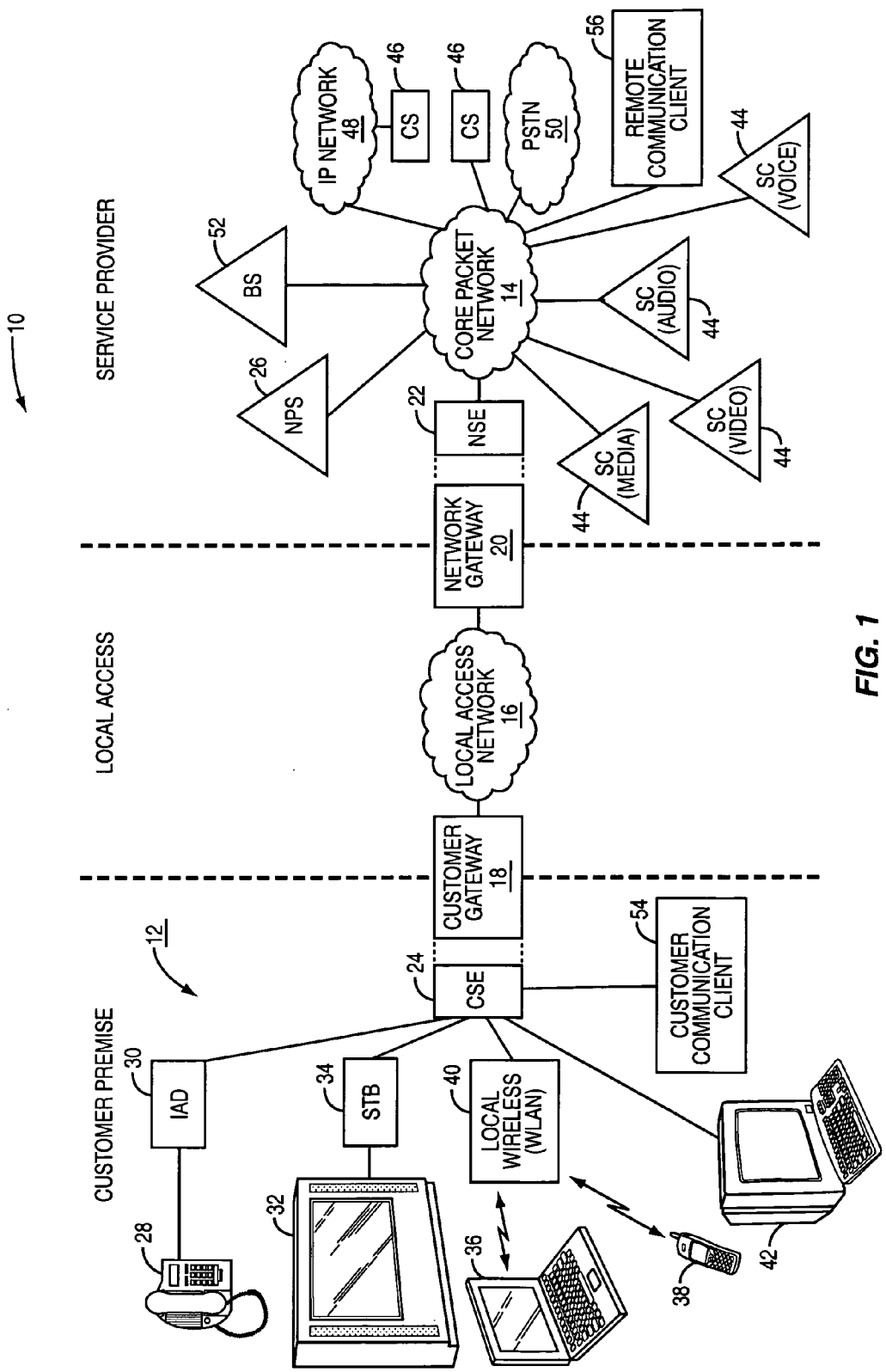
FIG. 1 is a block representation of a communication environment according to one embodiment of the present invention.

The present invention provides a unique way to select appropriate media capabilities for communication clients, which are initiating a communication session therebetween. When different media capabilities are available, an independent arbiter assists in negotiating an appropriate media capability for the communication session and communication clients. The concepts of the present invention are applicable in any number of communication networks and environments. For the purposes of illustration, an exemplary communication environment in which bandwidth is partitioned for multiple services is used to describe the invention; however, the invention is not limited to this illustrated environment. With reference to FIG. 1, a communication environment according to this embodiment is illustrated. The communication environment 10 may include various types of customer premise equipment (CPE) 12 that receive packet-based services from a core packet network 14 via a local access network 16 and provide a communication client of some form. Depending on the configuration, a customer gateway 18 may be provided to terminate the local access network 16 for the CPE 12. Similarly, a network gateway 20 may be provided to facilitate interworking between the local access network 16 and the core packet network 14. Additionally, a customer service edge (CSE) 24 may be provided at the customer premise in a standalone device or integrated into the CPE 12 or customer gateway 18. The purpose of the CSE 24 is to provide a trust domain with the access network provider and accept control directives from the network that enable media flows on both a service-by-service and session-by-session basis. The CSE 24 is used to help maintain the integrity of the overall system. In addition, this trusted status can be used to allow third parties access to utility reading functions and digital right management functions, ensuring a restricted access to functions within the residence.

In a fashion analogous to the CSE 24, a network service edge (NSE) 22 may be logically positioned between the local access network 16 or network gateway 20 and the core packet network 14. Like the CSE 24, the NSE 22 is implemented in a standalone device or is integrated into the network gateway 20 or other routing entity in the core packet network 14. For services provided to the CPE 12 via the local access network 16, the CSE 24 and the NSE 22 may operate to establish virtual communication pipes over the local access network 16 for each of the services provided to the CPE 12. In essence, the virtual communication pipes are virtual paths having defined parameters, which are sufficient to support the traffic flow associated with a particular service, in either direction. Alternatively, the access network may be a single digital channel that is multiplexed in time to provide the virtual communication pipes.

The CSE 24 and the NSE 22 may operate under the control of a network policy server (NPS) 26, which can instruct the CSE 24 and the NSE 22 to establish the virtual communication pipes for selected services and control the traffic flows therein. In other embodiments, the NPS 26 will not need to instruct the CSE 24 and NSE 22 to contact the virtual communication pipes. The NPS 26 may also provide policy rules to the CSE 24 and NSE 22 which can each govern their resource allocations, control QoS and other aspects as described below. The CSE 24 and NSE 22 will cooperate to allocate resources and ensure a desired quality of service, along with providing control or shaping of traffic flow for the service. Depending on the available bandwidth and the number of services implemented, the CSE 24 and NSE 22 may also provide packet queuing and make decisions on prioritizing packets based on the parameters associated with each service.

Different types of services may be supported over different virtual communication pipes to various ones of the CPE 12. The CPE 12 may take many forms and support various types of services, such as circuit-switched or packet-based telephony, television, data, audio, and video. Various types of CPE 12 are represented in FIG. 1, but those skilled in the art will recognize that the invention is not limited to the illustrated embodiments. The CPE 12 may take many forms, such as a telephony terminal 28, which is associated with the CSE 24 via an integrated access device (IAD) 30, which effectively performs voice over packet-to-Plain Old Telephone System (POTS) adaptation. For television service, a television 32 may be supported by a set top box (STB) 34, which cooperates with the CSE 24 to facilitate television service. A notebook computer or PDA 36, as well as a mobile terminal 38 may facilitate local wireless communications via a local wireless access point 40, which may facilitate local wireless communications using Wireless Local Area Network (WLAN), Bluetooth, or other local wireless technology. A personal computer 42 may also be logically associated with the CSE 24 to facilitate various types of media services, including streaming audio, video, and voice, along with traditional data services.

For the sake of conciseness and readability, a generic CPE 12 is shown as a customer communication client 54, which may take any number of forms, including those of the CPEs 12 as illustrated. In the following operational examples, the customer communication client 54 will interact with one or more service controllers 44 to receive one or more services or establish communications with a remote communication client 56. As with the customer communication client 54, the remote communication client 56 represents a generic communication client with which a communication session may be established.

For any of the varied services capable of being provided to the CPE 12, the CSE 24 and the NSE 22 may function to allocate bandwidth for the virtual communication pipe and control the traffic flow for the service and other services and their respective virtual communication pipes to ensure that each service is delivered with an appropriate quality of service, as well as preventing unauthorized use of unallocated bandwidth.

In operation, the NPS 26 may have access to information bearing on the services that a particular subscriber is authorized to use. The information controlling access to these services is generally referred to as a user policy, which will have various parameters defining the resources that are either necessary or authorized to be used to facilitate the service. The NPS 26 may also keep track of the overall resources available through the local access network 16 as well as the services being implemented at any given time. As such, the NPS 26 will recognize which resources are being used and which resources are available for new services. Based on this information, intelligent decisions can be made to ensure that a requested service can be fulfilled.

In general, the services are provided in uni-directional or bi-directional communication flows with the CPE 12 over the local access network 16, wherein the packet flows are controlled in the downstream direction (toward the CPE 12) by the NSE 22, and controlled in the upstream direction (from the CPE 12) by the CSE 24. The traffic flows, which ride on top of the packet flows, are generally controlled by service controllers (SCs) 44, which may interact with the CPE 12 to facilitate the transmission of packets between the CPE 12 and a content server (CS) 46. The service controllers 44 will cooperate with the content servers 46, and perhaps with the CPE 12, to facilitate the delivery of content to effect a service over one of the virtual communication pipes. Alternatively, the services may be provided by other entities provided in an associated Internet Protocol (IP) network 48 or the Public Switched Telephone Network (PSTN) 50, which may be coupled to the core packet network 14 via an appropriate gateway (not shown).

Figure 2:
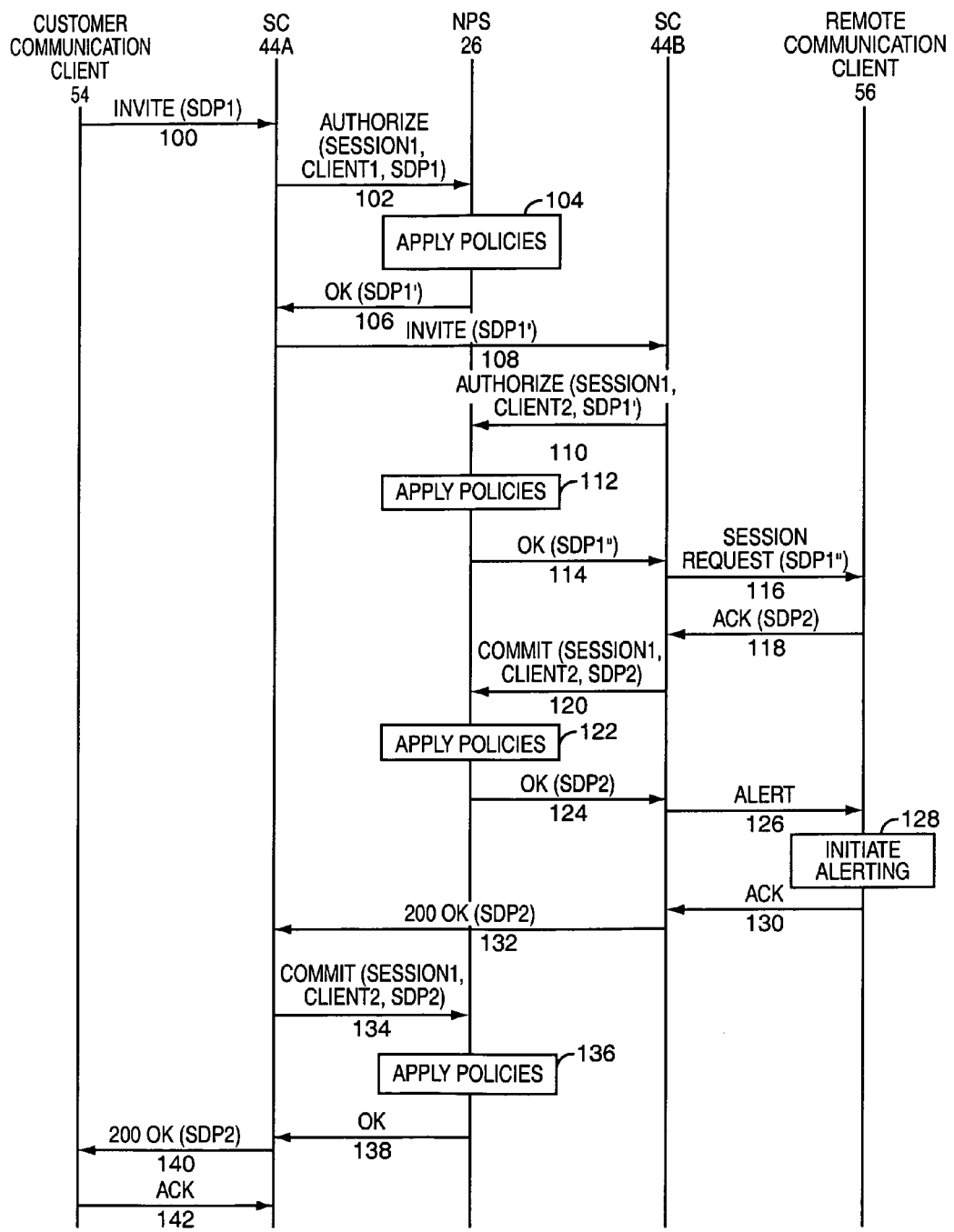
FIG. 2 represents a first exemplary communication flow according to one embodiment of the present invention.

Turning now to FIG. 2, operation of the present invention is illustrated with respect to an exemplary embodiment. As illustrated, media capability selection for a communication session initiated by a customer communication client 54 to a remote communication client 56 is provided by the NPS 26. During the process, the customer communication client 54 will initially request a session by sending an appropriate session request to an affiliated service controller 44A, which will interact with the NPS 26 to determine the appropriate media capabilities. The NPS 26 will interact with a service controller 44B, which is associated with the remote communication client 56, to obtain the appropriate media capabilities of the remote communication client 56. With information related to the media capabilities for both the customer communication client 54 and the remote communication client 56, the NPS 26 can apply the requisite policies to determine an appropriate media capability for the communication session. Although there are multiple service controllers 44A and 44B used in the example, one or more service controllers 44 may be used in providing a service to the customer communication client 54 or the remote communication client 56. Further, services may be provided directly to the customer communication client 54 without the need to involve a remote communication client 56, depending on the type of services rendered. In this example, assume a voice session is desired between the customer communication client 54 and the remote communication client 56.

In this example, the Session Initiation Protocol (SIP) is used by the customer communication client 54. Those skilled in the art will recognize other session control protocols in addition to SIP. When using SIP, certain message, such as a SIP Invite message that is used to request a session, may include Session Description Protocol (SDP) information, which is used in SIP to identify the media capability or capabilities for the communication clients.

To initiate the session, assume that the customer communication client 54 sends an Invite message to request a communication session with the remote communication client 56 (step 100). The Invite message will be directed to a service controller 44A, which, acting as a SIP user agent, is used to control voice services associated with the customer communication client 54. Further, the Invite message will include SDP information SDP1, which identifies multiple media capabilities that are capable of being supported by the customer communication client 54. In this example, the media capabilities for voice sessions for the customer communication clients 54 identify voice codecs for G.711, G.726, and G.729 voice encoding.

When the service controller 44A receives the initial Invite message, it immediately sends an Authorization Request to the NPS 26 to authorize the resources and media capabilities advertised by the customer communication client 54 (step 102). The Authorization Request will identify the requested session (SESSION1), the customer communication client 54 (CLIENT1), and the Session Description Protocol information (SDP1). The NPS 26 will analyze the Authorization Request to determine any applicable policies and will apply the pertinent policies to the session request (step 104). Notably, because the end-to-end path with the remote communication client 56 is indeterminate at this time, not all policies can be identified during this phase of the session establishment. Given the advertised capabilities of the remote communication client 56 or any other service limitations or constraints, the policies to apply towards the session and the respective communication clients may potentially change. Accordingly, the NPS 26 will respond to the Authorization Request of the service controller 44A with an OK message including revised SDP information, SDP1', which may include all the media capabilities advertised in the original request or a subset thereof, depending on the policies applied by the NPS 26 (step 106). Assume that the NPS 26 applied certain policies and eliminated G.729 encoding as a possibility. As such, the SDP1' will include both G.711 and G.726 voice encoding capabilities.

At this point, the service controller 44A is armed with the revised SDP information SDP1', and will forward an Invite message with the revised SDP information (SDP1') to the service controller 44B associated with the remote communication client 56 (step 108). The service controller 44B will determine that the destination for the session request is the remote communication client 56. The service controller 44B may choose to seek authorization at this point, which is illustrated in the communication flow example; however, this step may be deferred. Assuming that authorization does take place, the service controller will send an Authorization Request to the NPS 26, which identifies the session (SESSION1), the remote communication client 56 (CLIENT2), and the revised SDP information (SDP1') (step 110). The NPS 26 will access policies in light of the Authorization Request and apply any requisite policies (step 112). Since both the customer communication client 54 and remote communication client 56 are known at this time and the path for the communication session is known or can be determined, a full set of policies for the communication session and respective communication clients is identifiable. The applicable policies are applied, and the NPS 26 will return further revised SDP information (SDP1") to the service controller 44B in an OK response (step 114). The service controller 44B will send a Session Request to the remote communication client 56 (step 116). The Session Request may be a SIP Invite message or other appropriate session request, and will include the further revised SDP information (SDP1").

The remote communication client 56 will use the further revised SDP information (SDP1") as a guide for selecting a media capability to use for the forthcoming communication session. At this point, the available voice codecs and the further revised SDP information (SDP1") includes acceptable voice codecs for the communication session. As such, the remote communication client 56 will select one of the available media capabilities or voice encoding schemes, and send an Acknowledgement (ACK) for the session request to the service controller 44B (step 118). The ACK message will include the SDP information selected by the remote communication client 56 (SDP2). The service controller 44B will then send a request to commit the resources for the communication session to the NPS 26 (step 120). The Commit request will identify the session (SESSION1), the remote communication client 56 (CLIENT2), and the selected SDP information (SDP2) so that the NPS 26 can apply the requisite policies and commit the appropriate resources (step 122). By committing resources, the NPS 26 can reserve and allocate bandwidth for the communication session to manage resources and available bandwidth in the network or networks involved in the communication session. The NPS 26 can send an OK message back to the service controller 44B to respond to the Commit request (step 124).

At this point, the service controller 44B is authorized to interact with the remote communication client 56 to initiate the communication session, and may do so by sending an Alert message to the remote communication client 56 (step 126), which will initiate alerting, such as by triggering ringing or by initiating a pop-up to indicate that there is an incoming communication session, such as a call (step 128). When answered, the remote communication client 56 will send an Acknowledgment message to the service controller 44B (step 130), which will send a 200 OK message including the selected SDP information (SDP2) to the service controller 44A in response to the Invite message of step 108 (step 132).

At this point, the service controller 44A will send a Commit request to the NPS 26 to commit the resources necessary for the communication session on behalf of the customer communication client 54 (step 134). The Commit request will identify the session (SESSION1), the remote communication client 56 (CLIENT2), and the selected SDP information (SDP2). The NPS 26 will apply any policies for the request (step 136) and respond with an OK message (step 138). At this point, the NPS 26 is aware of the resources necessary from both ends of the communication session, and can control bandwidth and manage resources as necessary.

The service controller 44A is now ready to respond to the original Invite message sent in step 100, and will send a 200 OK message with the selected SDP information (SDP2) to the customer communication client 54 (step 140), which will send an Acknowledgement back to the service controller 44A (step 142). At this point, the communication session may begin, wherein the customer and remote communication clients 54, 56 know the requisite media capabilities for the communication session. Within these messages, the addresses and port numbers for the respective communication clients will be exchanged, and packets may be delivered between the communication clients as dictated by the communication session requirements.

As seen from the above, the NPS 26 plays an active role in determining the media capabilities for a communication session. The NPS 26 may look at the available media capabilities for the respective communication clients in light of various types of policy considerations, such as those imposed by the respective subscribers, a subscriber's group, network parameters, and network capabilities, including current network conditions. The NPS 26 can look at the bandwidth required for each media capability and compare it to the available resources in the network or the available service levels or network conditions. In certain instances, the NPS 26 can modify the media capabilities to bring the described media session into compliance with available network resources. By having this capability at the NPS 26, prioritization of media capabilities can be performed based on the various media selection policies.

In the event that a compatible media capability is not available that is common to both communication clients, the NPS 26 may operate to establish the session through a media proxy, which is capable of providing the appropriate conversion between available media capabilities. Further, when multiple media capabilities are available, various arbitration rules may be employed. In a simple example, the lowest rate codec for a voice session may be chosen. Alternatively, the NPS 26 may function to direct the service controllers 44 or communication clients to select an appropriate one of the multiple media capabilities. In one embodiment, the media capabilities may be advertised in a given order of priority.

In another embodiment, the NPS 26 may install policy rules on the CSE 24 and NSE 22, allowing the virtual communication pipe to reserve the resources associated therewith. Once the virtual communication pipe is established, the service controllers 44 will communicate with the appropriate content server 46, and perhaps the affected CPE 12, to facilitate packet delivery for the requested service. If the requested service is high-definition television content, the content server 46 delivers a high-definition television program over an appropriately configured virtual communication pipe to the television 32 via the set top box 34. The CSE 24 and NSE 22 ensure that the content is delivered with a required quality of service, and ensure that other services do not interfere with the high-definition television content. The NPS 26 controls the CSE 24 and NSE 22 to ensure that the services do not conflict. To prevent such conflict, a requested service may be denied if there is insufficient bandwidth or other resources to provide the service; quality of service levels may be adjusted, if authorized, to accommodate the multiple services; or a service may be eliminated according to a defined priority profile.

The various services may be accounted for in different manners, such that telephone services are billed at a different rate than television or data services. In this instance, various ones of the NSE 22, NPS 26, service controller 44, or content server 46 may facilitate accounting or billing, and may generate billing information or send sufficient information to a billing server (BS) 52 to effect billing for the particular services. Depending on the implementation of the services, each service may be accounted for on a per-service basis, such as pay-per-view television, or a service may be provided on a limited basis for a monthly fee wherein additional features may include additional charges.

In typical operation, a CPE 12 requests a service from a service controller 44 in the network. The request may describe one or more media flows that are to be instantiated as part of the requested service. The service controller 44 is typically operated by a service provider, which may or may not be owned by the local access network provider. The service controller 44 will perform application level authorization such as user identity checks for the request. Assuming the request is authorized, the service controller 44 will request the NPS 26 to perform additional authorization required to grant the necessary media flow(s) from the client through the customer gateway 18, local access network 16, and network gateway 20. The NPS 26 may apply resource usage policies to authorize use of the network resources and may also determine whether there is sufficient capability in the local access network 16 to accommodate the media flows. The NPS 26 may communicate with the CSE 24 and the NSE 22 to verify that the local access network 16 can support the media flows and to create or modify policies and/or policy rules in these network elements to enable them accordingly. The NPS 26 then responds to the service controller 44, which informs the CPE 12 to initiate the service.

The present invention helps to ensure that:

Per session quality of experience is maintained where the local access network 16 is a limiting factor.

Billing and authorization control can be maintained on all media flows, which have quality of experience guarantees.

Figure 3A:
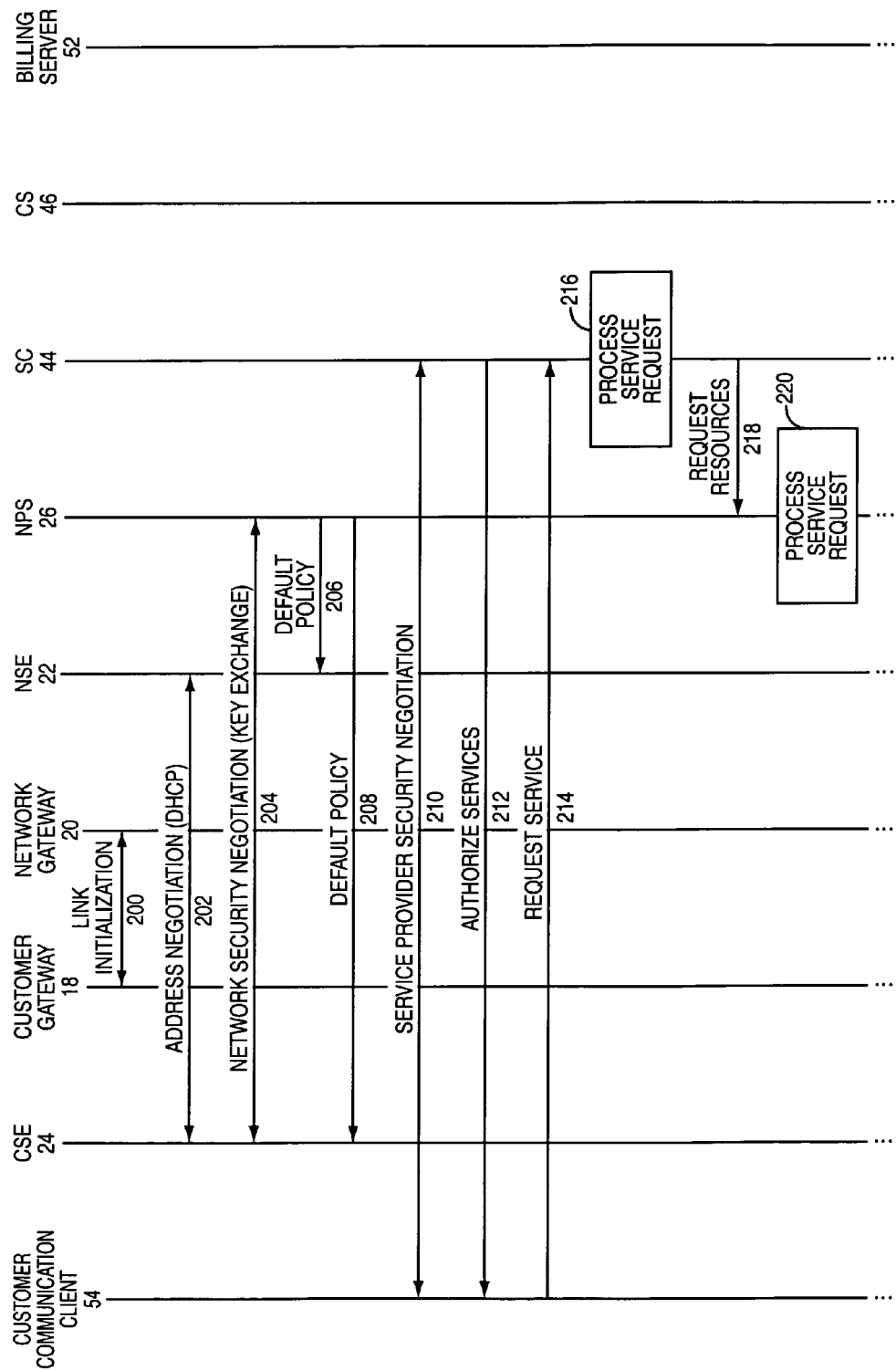
FIGS. 3A-3C represent a second exemplary communication flow according to one embodiment of the present invention.
Figure 3B:
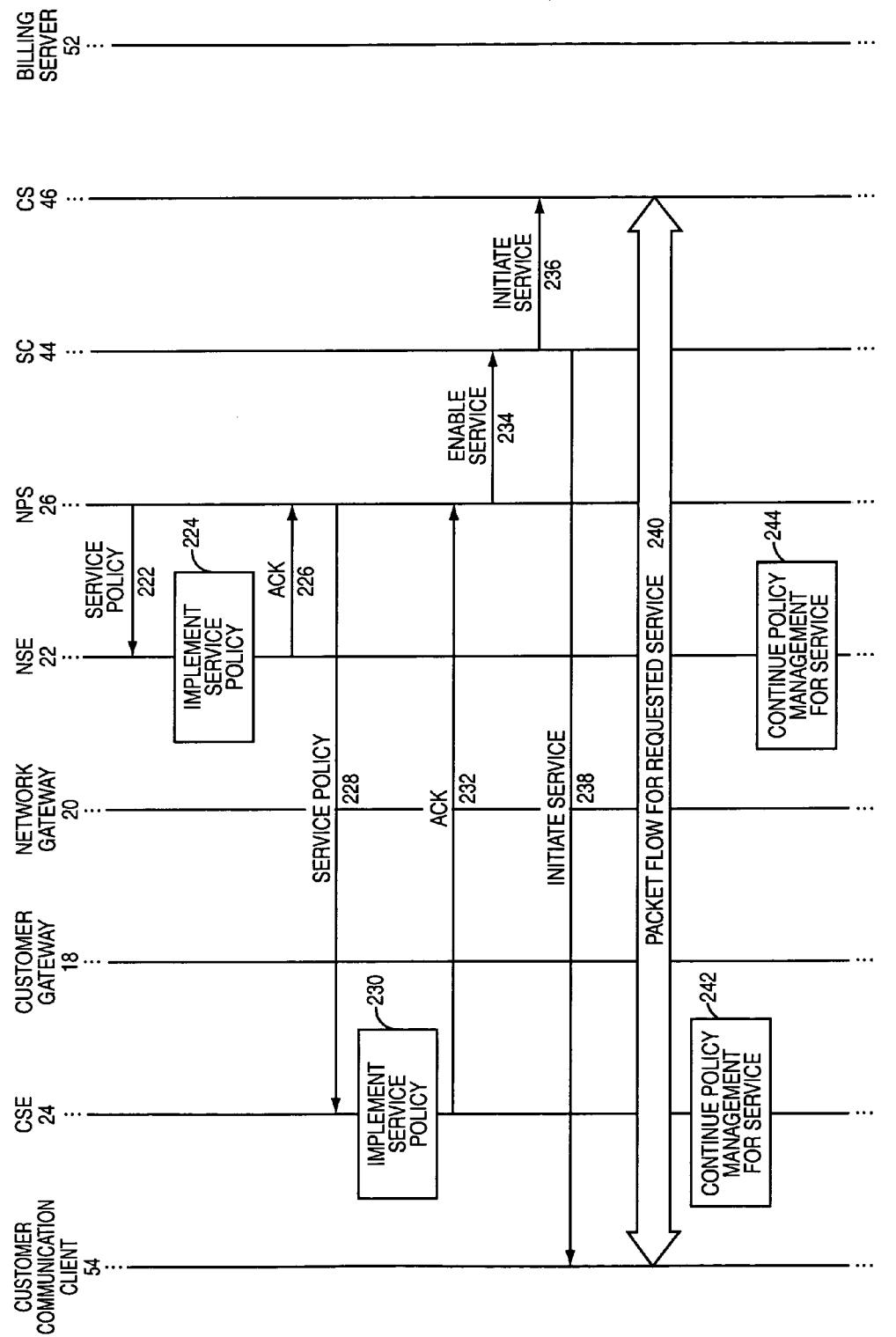
Figure 3C:
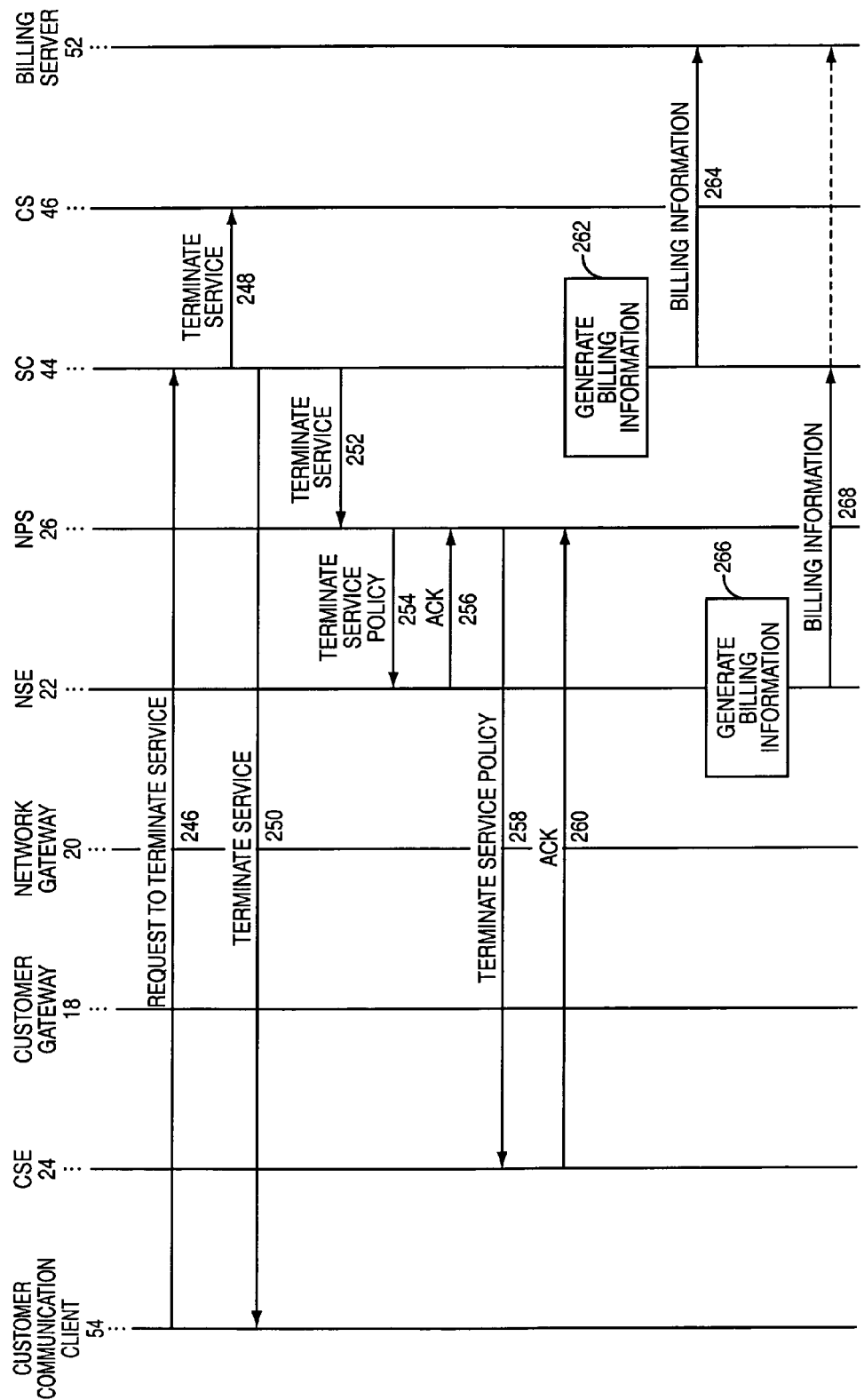

Turning now to FIGS. 3A-3C, an exemplary communication flow is provided for requesting and fulfilling a service according to a second embodiment of the present invention. Initially, the physical communication link between the customer gateway 18 and the network gateway 20 must be initialized, such that communications across the local access network 16 may be facilitated (step 200). Next, the CSE 24, which preferably communicates using the Internet Protocol (IP), will determine its IP address and other basic connectivity provisioning data by using protocols such as Dynamic Host Configuration Protocol (DHCP), assuming this data is not pre-provisioned (step 202). The NSE 22 would typically relay the DHCP requests to a DHCP server connected on the core packet network. To establish a security policy, the CSE 24 and NPS 26 may negotiate a network security policy and exchange any public or private encryption keys to use for future communications (step 204). At this point, the NPS 26 recognizes that the CSE 24 is functional and ready to facilitate services for the CPE 12, and will send default policy parameters to both the NSE 22 and the CSE 24 (steps 206 and 208). These default parameters may establish any basic services that are always available to the CPE 12, as well as allow basic information exchange to request additional services. The NSE 22, being typically located on the telecom operator's premise, is a trusted network entity and does not need to go through the same authentication and authorization process.

For purposes of illustration, assume that a particular CPE 12 is again referenced as a customer communication client 54. The customer communication client 54 will request a service, which will require the establishment of a virtual communication pipe and a certain quality of service level. Initially, the customer communication client 54 may communicate with a selected service controller 44 associated with a service provider to establish a secured and authenticated relationship allowing the service controller 44 to trust service requests coming from the customer communication client 54 (step 210). At some point, the service controller 44 will send a final authorization to the customer communication client 54, allowing it to request services (step 212). When a user desires a particular service, the customer communication client 54 will generate and send a request for the service to the service controller 44 (step 214), which will process the service request (step 216) to determine if the customer communication client 54 is authorized to receive the service. If the customer endpoint is authorized to receive the service, the service controller 44 will request resources for the service by sending an appropriate message to the NPS 26 (step 218). The NPS 26 will process the resource request to determine if the resources for the service are available (step 220). The NPS 26 maintains a network topology database which keeps track of what resources (such as bandwidth, multiplexing points, etc.) are available at various points in the access network. The NPS 26 may contain a network topology database and this database may include information on resources and other parameters as described herein. Alternatively, the NPS 26 may merely have access to such a database or may rely upon the network elements themselves to keep track of resource availability and other parameters. The NPS 26 also keeps track of the existing traffic flows running in the access network and how much of the access network resources are currently used by the existing traffic flows. If the network resources allow the newly requested traffic flow to be set up, the NPS 26 will add the new traffic flow to its database. In addition to determining if the resources are available for the service, the NPS 26 may also determine whether the resources should be allocated for the service based on a service policy associated with the user or the particular customer communication client 54.

Assuming the resources are available and the network policy dictates that the resources can be allocated for the service, the NPS 26 will create a service policy, which defines the parameters that will be used to control the packet flow over the local access network 16 for the service. The service policy is then sent to the NSE 22 (step 222), which will implement the service policy for downstream packet flows (step 224), and acknowledge receipt of the service policy (step 226). Similarly, the NPS 26 will send a service policy to the CSE 24 (step 228), which will implement the service policy for upstream traffic flows (step 230) and acknowledge receipt of the service policy (step 232). The parameters received in association with the service policy at the CSE 24 and the NSE 22 are sufficient to establish the virtual communication pipe for the service and control packet flow for the services according to the various parameters, which may control quality of service levels, queuing, traffic control or shaping, or any necessary filtering, in either direction. In the illustrated embodiment, the CSE 24 uses the service policy parameters to control upstream traffic from the customer communication client 54 to the content server 46 and the NSE 22 will use the service policy parameters to control the traffic flow from the content server 46 to the customer communication client 54.

Once the service policies are in place at the CSE 24 and the NSE 22, the NPS 26 will instruct the service controller 44 to enable the service (step 234). In response, the service controller 44 will instruct the content server 46 to initiate the service (step 236), and may send a message to the customer communication client 54 to initiate the service or indicate that the service has been initiated (step 238). At this point, the service is initiated, and the packet flow for the requested service may take place between the customer communication client 54 and the content server 46 over the virtual communication pipe (step 240). Notably, the content server 46 is only used for illustration, and those skilled in the art will recognize that the content server 46 may represent a telephony device, streaming audio or video service, television service, data service, video conferencing service, or virtually any other media service requiring a certain level of quality of service and for which differentiated accounting may be desired.

Throughout the service being provided, the CSE 24 and the NSE 22 will continue managing the respective packet flows according to the policy parameters (step 242 and 244). Such management will include classifying traffic flows for the various services that are implemented; providing queuing; maintaining a desired quality of service; shaping, controlling, or filtering the traffic; or preventing unauthorized use of the local access network 16 by other CPEs 12. The CSE 24 and NSE 22 will effectively route all traffic for all services over the appropriate virtual communication pipes according to the defined policy parameters. Traffic for the service may be recognized by checking an identifier or label provided with the packets and associated with the particular service. In a preferred embodiment, the source and destination addresses, and potentially the respective ports used by the CPE 12 and the content server 46, are monitored to identify packets to be transported over the virtual communication pipe in association with the service and according to the policy parameters. Accordingly, differentiated services may be provided over a single local access network 16 in a controlled fashion. With the present invention, the local access network 16 can be effectively partitioned among multiple services in a manner wherein the respective services will not negatively impact the others.

In addition to the above benefits, differentiated billing for the respective services is available. Since the services may be established on an individual basis, accounting for these services may also be provided on an individual basis. Various entities illustrated in FIG. 1 may be used to collect accounting information, which will be processed and sent directly or indirectly to the billing server 52. The accounting information may be processed during the service, after the service, or a combination thereof. For example, when a service is terminated, the customer communication client 54 may send a request to terminate the service to the service controller 44 (step 246), which will send a message to the content server 46 to terminate the service (step 248), as well as sending a message to terminate the service to the customer communication client 54 (step 250). The service controller 44 will notify the NPS 26 that the service is terminated (step 252). In response, the NPS 26 will take the necessary steps to remove the service policy and tear down the virtual communication pipe established between the CSE 24 and the NSE 22.

The NPS 26 may send a message to terminate the service policy to the NSE 22 (step 254), which may send an acknowledgement back to the NPS 26 (step 256). The NPS 26 will then send a message to terminate the service policy to the CSE 24 (step 258), which may respond with an acknowledgement to the NPS 26 (step 260). If billing is based on content, the service controller 44 may generate billing information (step 262) and send the billing information to the billing server 52 (step 264). Alternatively, the NSE 22 may generate the billing information (step 266) and forward the billing information to the service controller 44 or directly to the billing server 52 (step 268). Those skilled in the art will recognize numerous techniques for monitoring the service, accounting for the service, and delivering accounting or billing information to an appropriate billing server 52 to facilitate billing for the provided service.

Figure 4:
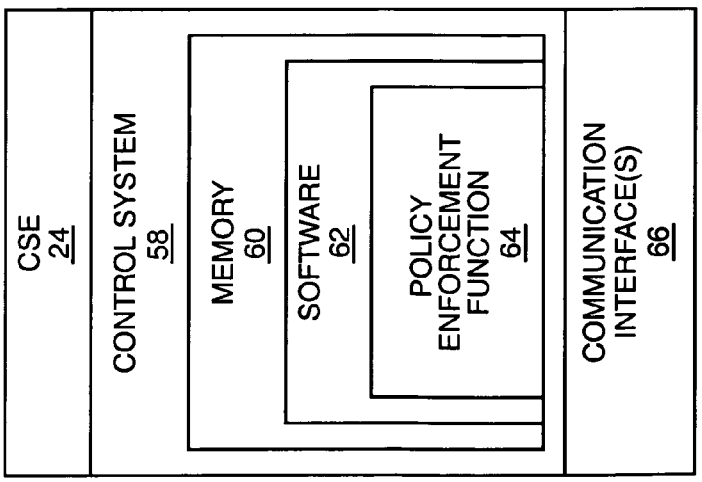
FIG. 4 is a block representation of a customer service edge according to one embodiment of the present invention.

Turning now to FIG. 4, a block representation of a CSE 24 is provided according to a standalone embodiment of the present invention. The CSE 24 may include a control system 58 having memory 60 with sufficient software 62 to facilitate operation as described above. In particular, a policy enforcement function 64 is implemented in the software 62 to communicate with the NPS 26 and the NSE 22 to establish virtual communication pipes and enforce policies for the service according to the parameters received from the NPS 26. The control system 58 may be associated with one or more communication interfaces 66 to facilitate communication with the customer gateway 18 or local access network 16, as well as with various ones of the CPE 12.

Figure 5:
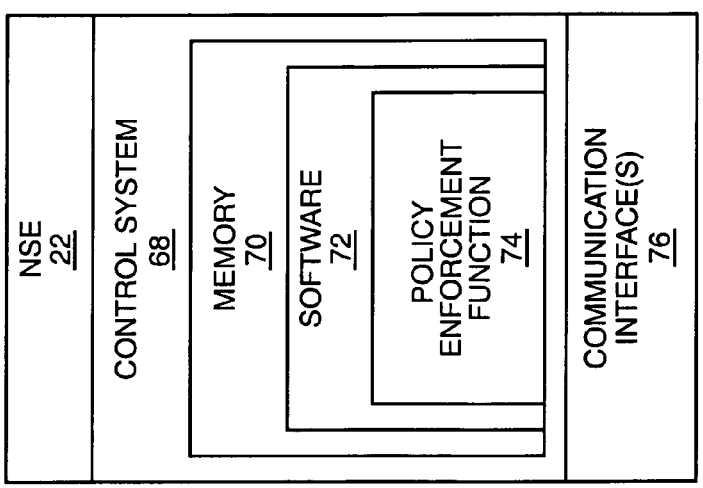
FIG. 5 is a block representation of a network service edge according to one embodiment of the present invention.

As seen in FIG. 5, the NSE 22 is configured similarly to the CSE 24. The NSE 22 will include a control system 68 having memory 70 with sufficient software 72 to operate as described above. The software 72 will provide a policy enforcement function 74 to allow virtual communication pipes with the CSE 24 over the local access network 16 and control services according to parameters received from the NPS 26. The control system 66 will be associated with one or more communication interfaces 76 to facilitate communication over the local access network 16 directly or indirectly via the network gateway 20, as well as with the NPS 26.

Figure 6:
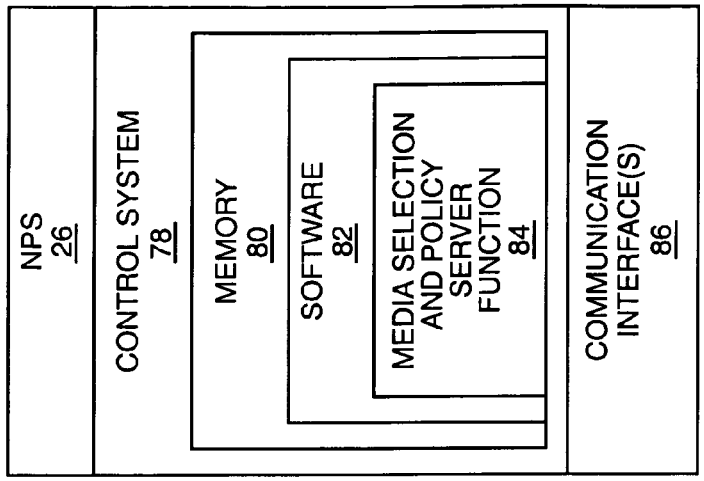
FIG. 6 is a block representation of a network policy server according to one embodiment of the present invention.

With reference to FIG. 6, the NPS 26 represents a logical function, but may be implemented in a traditional network server having a control system 78 with memory 80 for software 82 to control the operation as described above. The software 82 will include a media selection and policy server function 84, which will act to control the CSE 24 and the NSE 22 to provide and control services over the local access network 16, as well as cooperate with the content servers 44 or other entity involved in providing the service. For such communications, the control system 78 is associated with at least one communication interface 86.

Those skilled in the art will recognize improvements and modifications to the preferred embodiments of the present invention. All such improvements and modifications are considered within the scope of the concepts disclosed herein and the claims that follow.

What is claimed is:

1. A method comprising:
receiving a first message in association with an attempt to establish a communication session from a first communication client, the first message including first media capabilities of the first communication client;
selecting at least one of the first media capabilities based on a media capability selection policy to determine first selected media capabilities; and
sending a first response message including the first selected media capabilities in response to the first message, such that the communication session is established using one of the first selected media selection capabilities.

2. The method of claim 1 further comprising:
receiving a second message in association with establishing the communication session with a second communication client;
selecting at least one of the first media capabilities based on the media capability selection policy to determine second selected media capabilities; and
sending a second response message including the second selected media capabilities in response to the second message, such that the communication session is established using one of the second selected media selection capabilities.

3. The method of claim 1 further comprising:
receiving a request to commit resources for the communication session; and
sending a response to the request to authorize use of the resources for the communication session.

4. The method of claim 1 wherein the communication session is established with a content server.

5. The method of claim 1 wherein the communication session is established with another communication client.

6. The method of claim 1 wherein the first media capabilities are carried in a session description protocol.

7. The method of claim 1 wherein the media capability selection policy controls centralized arbitration of media capabilities for communication sessions between communication clients.

8. The method of claim 2 wherein the first message is received from a first service controller, which is adapted to control services provided to the first communication client via the communication session.

9. The method of claim 2 wherein the second communication client selects the one of the second selected media capabilities used for the communication session.

10. The method of claim 8 wherein the second message is received from the first service controller.

11. The method of claim 8 wherein the second message is received from a second service controller, which is adapted to control services provided to the second communication client via the communication session.

12. The method of claim 3 further comprising determining whether there are sufficient resources for the communication session.

13. The method of claim 12 further comprising controlling allocation of resources for communication sessions, including the communication session, based on defined policies.

14. A system comprising:
at least one communication interface; and
a control system comprising a memory, the control system associated with the at least one communication interface and adapted to:
receive a first message in association with an attempt to establish a communication session from a first communication client, the first message including first media capabilities of the first communication client;
select at least one of the first media capabilities based on a media capability selection policy to determine first selected media capabilities; and
send a first response message including the first selected media capabilities in response to the first message, such that the communication session is established using one of the first selected media selection capabilities.

15. The system of claim 14 wherein the control system is further adapted to:
receive a second message in association with establishing the communication session with a second communication client;
select at least one of the first media capabilities based on the media capability selection policy to determine second selected media capabilities; and
send a second response message including the second selected media capabilities in response to the second message, such that the communication session is established using one of the second selected media selection capabilities.

16. The system of claim 14 wherein the control system is further adapted to:
receive a request to commit resources for the communication session; and
send a response to the request to authorize use of the resources for the communication session.

17. The system of claim 14 wherein the communication session is established with a content server.

18. The system of claim 14 wherein the communication session is established with another communication client.

19. The system of claim 14 wherein the first media capabilities are carried in a session description protocol.

20. The system of claim 14 wherein the media capability selection policy controls centralized arbitration of media capabilities for communication sessions between communication clients.

21. The system of claim 15 wherein the first message is received from a first service controller, which is adapted to control services provided to the first communication client via the communication session.

22. The system of claim 15 wherein the second communication client selects the one of the second selected media capabilities used for the communication session.

23. The system of claim 21 wherein the second message is received from the first service controller.

24. The system of claim 21 wherein the second message is received from a second service controller, which is adapted to control services provided to the second communication client via the communication session.

25. The system of claim 16 wherein the control system is further adapted to determine whether there are sufficient resources for the communication session.

26. The system of claim 25 wherein the control system is further adapted to control allocation of resources for communication sessions, including the communication session, based on defined policies.

27. A system comprising:
means for receiving a first message in association with an attempt to establish a communication session from a first communication client, the first message including first media capabilities of the first communication client;
means for selecting at least one of the first media capabilities based on a media capability selection policy to determine first selected media capabilities; and
means for sending a first response message including the first selected media capabilities in response to the first message, such that the communication session is established using one of the first selected media selection capabilities.

28. The system of claim 27 further comprising:
means for receiving a second message in association with establishing the communication session with a second communication client;
means for selecting at least one of the first media capabilities based on the media capability selection policy to determine second selected media capabilities; and
means for sending a second response message including the second selected media capabilities in response to the second message, such that the communication session is established using one of the second selected media selection capabilities.

29. The system of claim 27 wherein the media capability selection policy controls centralized arbitration of media capabilities for communication sessions between communication clients.

* * * * *